United States Patent
Moghe et al.

(10) Patent No.: US 6,589,427 B2
(45) Date of Patent: Jul. 8, 2003

(54) PROCESS FOR TREATMENT OF MIXTURE OF SPENT WASH FROM DISTILLERY AND BLACK LIQUOR FROM PULP AND PAPER INDUSTRY

(75) Inventors: Pramod Prabhakar Moghe, Maharashtra (IN); Vinita Vinay Panchanadikar, Maharashtra (IN); Ashwini Vinayak Pol, Maharashtra (IN); Ajit Ramesh Joshi, Maharashtra (IN); Prakash Kondiba Bahirat, Maharashtra (IN); Priyadarshini Kudlu, Maharashtra (IN); Shekhar Prakash Bahirat, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 178 days.

(21) Appl. No.: 09/794,129

(22) Filed: Feb. 28, 2001

(65) Prior Publication Data

US 2002/0117455 A1 Aug. 29, 2002

(51) Int. Cl.$^7$ .................................................. C02F 1/42
(52) U.S. Cl. ........................ 210/667; 210/692; 210/714; 210/723; 210/724; 210/917; 210/919; 210/928; 162/189
(58) Field of Search ........................... 162/29, 189–191; 210/665–667, 714, 692, 723–728, 919, 928, 917

(56) References Cited

U.S. PATENT DOCUMENTS

| | | | | |
|---|---|---|---|---|
| 3,652,407 A | * | 3/1972 | Paleos ........................ 210/668 |
| 4,070,234 A | * | 1/1978 | Anderson et al. .............. 162/29 |
| 4,251,651 A | * | 2/1981 | Kawakami et al. .......... 526/204 |
| 4,254,250 A | * | 3/1981 | Glowaky et al. ............ 525/350 |
| 4,293,416 A | * | 10/1981 | Keoteklian ................... 210/208 |
| 5,120,448 A | * | 6/1992 | Dorica et al. ................ 210/724 |
| 5,589,075 A | * | 12/1996 | Sivakumar et al. .......... 210/727 |
| 5,614,102 A | * | 3/1997 | Sakurada ..................... 210/718 |
| 5,766,485 A | * | 6/1998 | Lind et al. ................... 210/711 |

* cited by examiner

Primary Examiner—Peter A. Hruskoci
(74) Attorney, Agent, or Firm—Oliff & Berridge, PLC

(57) ABSTRACT

This invention relates to a process for treating an effluent comprising a mixture of spent wash and black liquor, said process comprising mixing the effluent with a flocculating agent consisting of a mixture of salts of Group III and transition metals, mixture of natural earth's along with an oxide of alkaline earth metal followed by treating with a combination of ion exchange resins.

15 Claims, No Drawings

PROCESS FOR TREATMENT OF MIXTURE OF SPENT WASH FROM DISTILLERY AND BLACK LIQUOR FROM PULP AND PAPER INDUSTRY

BACKGROUND

Field of the Invention

This invention relates to an improved process for the treatment of an effluent comprising a mixture of spent wash from distillery and black liquor from pulp & paper industry. More particularly the invention is related to an improved method for the reduction of Chemical Oxygen Demand (COD), Biological Oxygen Demand (BOD), Total Dissolved Solids (TDS) and color from the mixture of effluents of distillery and pulp & paper industry.

DESCRIPTION OF RELATED ART

Background and Prior Art References

In recent years, industrial effluents have been regarded as common source of pollution, because of lack of efficient treatment and improper mode of disposal of effluents generated by industries. Under these circumstances aquatic life suffers, resulting in loss of productivity natural waters and deterioration of water quality to such an extent that the water becomes unusable. It is obvious that the proper treatment of Distillery effluent (Spent Wash) and effluent from Pulp & Paper industry (Black Liquor) is quite necessary. The alcohol industry in India is based on molasses as the principal raw material. Molasses contains around 15% of fermentable sugars, out of which 9% is utilized for conversion into alcohol during fermentation. The balance organic & inorganic chemicals in the molasses find their way into the effluent popularly known as spent was which is acidic in nature. Spent wash, which is dark in color, has high BOD, COD & TDS. The origin of dark color is mainly due to plant pigments, melanoidins, polyphenolic compounds and caramels that are produced by thermal degradation and condensation reactions of sugar.

The paper and board industries generally use bamboo, straws, bagasse, rags, waste papers and other agricultural residues as raw materials in their manufacturing units. There are several types of processes involved, for which the volume and characteristics of wastewater known as black liquor differ from mill to mill. Black liquor mainly contains 3–6% of lignin originated from the bark of the plant, which is not easily biodegradable, along with other organic and inorganic impurities. The dark color of the black liquor is mainly due to presence of polyphenolic bodies like coniferyl, sinapyl and p-coumaryl alcohols produced during partial degradation of lignin. The pulp & paper industry uses large amounts of water which is recycled and reused resulting in temperature rise and dissolution of more solids in water enhancing problems e.g. corrosion, slime and other deposits. Directly or indirectly, all of these viz. COD, BOD, Color and toxicity may affect aquatic life.

In order to conform to environmental quality guidelines a number of primary and secondary treatment systems such as clarifires, aerated lagoons, trickling filters, biomethanation and other biological systems are installed. All these treatments remove reasonably good amount of COD, BOD but not color toxicity and inorganic impurities. Due to stringent environmental norms, such partially treated effluents of distillery and paper industries are not allowed to mix in the natural stream.

In the prior art the following methods are used to remove COD, BOD, TDS and color of Black Liquor and Spent Wash separately. Several methods hitherto used are described in brief herein below.

Decolorization of Melanoidin Pigment from Distillery Spent Wash.

Patil, N. B.; Kapadnis, B. P. (School Environmental Sciences, Univ. Poona, Pune, India). Indian J. Environ. Health, 37(2), 84–7 (English) 1995. CODEN: IJEHBP. ISSN: 0367-827X. DOCUMENT TYPE: Journal CA 123:207790 (Waste Treatment and Disposal) Patil & Kapadnis have studied decolorization of spentwash melanoidin pigment by chem. and biol. methods. Spentwash from an anaerobic digester was treated with hydrogen peroxide, calcium oxide and soil bacteria. At 144 h. of incubation at varied concentration of hydrogen peroxide, the maximum decolorization and COD reduction was 98.67 and 88.40%, respectively.

An Absorption Mechanism for the Decolorization of Melanoidin by Rhizoctonia sp. D-90

Sirianuntapiboon, Suntud; Sihanonth, Prakitsin; Somchai, Praphaisri; Atthasampunna, Poonsook; Hayashida, Shinsaku (Thailand Inst. Scientific Technological Res., Bangkok 10900, Thailand). Biosci., Biotechnol., Biochem., 59(7), 1185–9 (English) 1995. CODEN: BBBIEJ. ISSN: 0916-8451. DOCUMENT TYPE: Journal CA Section: 60 (Waste Treatment and Disposal) Section cross-reference(s): 10, 16, CA 123:151772 Sirianuntapiboon et al have observed that Rhizoctonia species D-90 decolorized molasses melanoidin medium and a synthetic melanoidin medium by 87.5% and 84.5%, respectively under experimental growth conditions. Mycelia grown in solutions of melanoidin turned dark brown; however, the melanoidin (dark brown in color) could be eluted from mycelia by washing in a NaOH solution and the max yield of melanoidin from mycelia reached 96.1%. Mycelia grown in potato dextrose medium did not have any electron-dense materials in the cytoplasm or around the cell membrane, but when such mycelia were transferred to melanoidin media, abundant electron-dense material appeared in the cytoplasm and around cell membranes. Subsequently, the electron-dense materials disappeared when the mycelia were returned to the potato dextrose medium for further growth. The Rhizoctonia species D-90 melanoidin decolorization mechanism involved melanoidin pigment absorption by the cells as a macromol and its intracellular accumulation in the cytoplasm and around the cell membrane as a melanoidin complex, which was then gradually decolorized by intracellular enzymes.

Removal of Dissolved Organic Carbon in Winery and Distillery Wastewater by Application to Soil Chapman, J. A.; Correll, R. N.; Ladd, J. N. (Department of Soil Science, University of Adelaide, Glen Osmond 5064, Australia). Rev. Fr. Oenol., 152, 47–9 (English) 1995. CODEN: RFOEE4. ISSN: 0395-899X. DOCUMENT TYPE: Journal CA Section: 60 (Waste Treatment and Disposal) Section cross-reference(s): 16, CA 123:121955 Chapman et al has reported that wineries produce about 2–5 L wastewater/L of table wine manufactured. Wastewater is gaining recognition as a potential source of supplementary irrigation water, particularly in districts where restrictions have been placed on the use of groundwater for irrigation. Winery wastewater is usually lagooned, to allow solids to settle, before applying the effluent to soil. Lagooned winery and distillery effluents contain about 0.5–2 and 3–15 g organic carbon per liter respectively. This soluble carbon must be removed from the effluent to avoid unacceptable increases in the organic carbon in groundwater receiving excess water from the irrigated sites. The removal of soluble organic C from winery and distillery wastewater by adsorption and microbial decay in soils was detected under different levels of carbon loading.

Decolorization and Degradation of Melanoidins in Wastewater by Ionizing Radiation Sekiguchi, M.; Tanabe, T.; Sawai, T. (Tokyo Metropolitan Isotope Research Center, Tokyo 158, Japan). JAERI-Conf, 95-003(Proceedings of the 6th Japan-China Bilateral Symposium on Radiation Chemistry, 1994), 280–4 (English) 1995. CODEN: JECNEC. DOCUMENT TYPE: Journal CA Section: 60 (Waste Treatment and Disposal) Section cross-reference(s): 16, CA 123:92173

Sekiguchi et al has investigated the decolorization and degradation of molasses pigments (melanoidins) in wastewater from yeast factories by ionizing radiation. In the case of samples with the same value of chromaticity (4000), the reduction degree of chromaticity of dialyzed sample reached 27.5% and 75% at a dose of 4.5 kGy and 14 kGy, respectively and was greater than that of non-dialyzed sample. Organic acids such as oxalic acid, formic acid and glycolic acid were formed with increasing dose, and the biodegradability (BOD/COD) of wastewater was increased with decrease in pH. The relationships between the value of chromaticity/TOC and mol. wt. of molasses pigments were obtained from subsequent experiments using dialyzed and non-dialyzed samples with the same value of TOC.

Color Removal from a Waste Effluent by Combined Use of Fe(II), Lime and Bone Charcoal Shen, X.; Bousher, A.; Edyvean, R. G. J. (Dep. Chem. Eng., Univ. Leeds, Leeds LS2 9JT, UK). IChemE Res. Event—Eur. Conf. Young Res. Chem. Eng., 1st, Volume 1, 469–71. Inst. Chem. Eng.: Rugby, UK. (English) 1995. CODEN: 61OUA9. DOCUMENT TYPE: Conference CA Section: 60 (Waste Treatment and Disposal) Section cross-reference(s): 45, 49, CA 123:122024

A study was conducted by Shen et alto remove color from a chemical manufacturing effluent. The effluent contained high levels of soluble organic compounds. The effluent was intensely black, the high solubility of colored constituents made common coagulation or adsorption techniques unsuitable for color removal. Results showed that a combination of $FeCl_2.H_2O$ (as a reducing agent), lime, and bone charcoal removed 97% of the color.

Removal of COD and Nitrogen From Wastewater

Ishida, Koji; Iwabe, Hideki; Minami, Hirokazu; Kamisaka, Taichi (Kubota Kk, Japan). Jpn. Kokai Tokkyo Koho JP 07214093 A2 Aug. 15, 1995 Heisei, 4 pp. (Japan). CODEN: JKXXAF. CLASS: ICM: C02F009-00. ICS: C02F009-00; B01D019-00; C02F001-20; C02F001-78; C02F003-30. APPLICATION: JP 94-10156 Feb. 1, 1994. DOCUMENT TYPE: Patent CA Section: 60 (Waste Treatment and Disposal), CA 123:321319

The title process includes oxidizing COD-containing wastewater with $O_3$ to convert the COD to biologically decomposing organic substances or $HNO_3$—N, treating biol. in an aerobic tank under aerobic condition to oxidize and decompose the biol. decomposing organic substances and also to convert the residual N to $HNO_3$—N, and treating biol. in an anaerobic tank under anaerobic condition to remove the biol. decomposing organic substances and $HNO_3$—N.

Removal of COD and Nitrogen from Wastewater

Ishida, Koji; Iwabe, Hideki; Minami, Hirokazu; Kamisaka, Taichi (Kubota Kk, Japan). Jpn. Kokai Tokkyo Koho JP 07214092 A2 Aug. 15, 1995 Heisei, 4 pp. (Japan). CODEN: JKXXAF. CLASS: ICM: C02F009-00. ICS: C02F009-00; B01D019-00; C02F001-20; C02F001-58; C02F001-70; C02F001-78; C02F003-28. APPLICATION: JP 94-10157 Feb. 1, 1994. DOCUMENT TYPE: Patent CA Section: 60 (Waste Treatment and Disposal), CA 123:349361

The title process includes oxidizing COD-containing waster water by contacting with $O_3$ in an $O_3$ contact tank, blowing $N_2$ into the oxidn.-treated water in a dissolved $O_2$-removing tank to remove completely dissolved $O_2$, and biol. Treating in an anaerobic filtration bed under anaerobic condition.

Radiation Degradation of Molasses Pigment (II) (Molecular Weight Fraction)

Sawai, Teruko; Sekiguchi, Masayuki; Tanabe, Hiroko (Tokyo Metropolitan Isotope Research Center, Tokyo 158, Japan). Tokyo-toritsu Aisotopu Sogo Kenkyusho Kenkyu Hokoku, 13, 57–63 (Japanese) 1996. CODEN: TASHEK. ISSN: 0289-6893. DOCUMENT TYPE: Journal CA Section: 60 (Waste Treatment and Disposal) Section cross-reference(s): 17, CA 125:307983

Due to the scarcity of water sources within the city, Tokyo is dependent on water from other prefectures. Recycling municipal wastewater is an effective means of coping with water shortage in Tokyo. Radiation treatment of wastewater for water recycling was studied by Sawai et al, specifically, degradation of molasses pigments in yeast manufacturing effluent. Dialyzed molasses pigments and non-dialyzed samples in wastewater were compared by chromaticity, UV absorption, color difference, and COD content. Dialysis and fractionation by permeable membrane were conducted with seamless cellulose tubing (Union Carbide Corporation) and spectra/Por membrane (Spectrum Medical Industries, Inc.). Total organic C (TOC) concentrations decreased and the dark brown color faded with increasing dose. High mol. wt. components of molasses pigments were degraded to lower mol. wt. substances and decomposed to $CO_2$. The relationships between chromaticity/TOC and molasses pigments mol. wt. were obtained by radiation.

Removal of Carboxylic Acids from Wastewater Using Polyaluminum Chlorohydrate Brown, William M.; Trevino, Maria (Baker Hughes, Inc., USA). U.S. U.S. Pat. No. 5,395,536 A Mar. 7, 1995, 5 pp. (United States of America). CODEN: USXXAM. CLASS: ICM: C02F001-56. NCL: 210727000. APPLICATION: U.S. Ser. No. 93-57879 May 7, 1993. DOCUMENT TYPE: Patent CA Section: 60 (Waste Treatment and Disposal), CA 123:40265

After or during initial contact of the wastewater with the composition comprising polyaluminum chlorohydrate and a cationic polyelectrolyte, an organic liq. may optionally be added after which separation into an aq. phase and an organic phase occurs whereby the organic acids are removed in the organic phase which was reported by Brown &

Trevino. The preferred polyaluminum chlorohydrate is aluminum chlorohydrate, and the preferred cationic polyelectrolyte is a high mol. wt. poly(di-Me diallyl)ammonium chloride.

Methods of Wastewater Treatment in Sugar Industry

Stuchl, Ivan (Vyzk. Ustav Cukrovarnicky, CUKRSPOL Praha-Modrany, a. s., Prague-Modrany, Czech Rep.). Listy Cukrov. Reparske, 111(1), 14–20 (Czech) 1995. CODEN: LCUREK. ISSN: 1210-3306. DOCUMENT TYPE: Journal; General Review CA Section: 60 (Waste Treatment and Disposal) Section cross-reference(s): 44, CA 122:321440

In a review with 10 refs, treatment of waste water from sugar industry in Czech Republic and many other European countries is evaluated.

Treatment of Wastewater from Sugar Manufacture

Alexoiu, N. Elena (Intreprinderea pentru Industrializarea Sfeclei de Zahar, Tandarei, Rom.). Rom. RO 100158 B1 Oct. 25, 1991, 5 pp. (Romania). CODEN: RUXXA3. CLASS: ICM: C02F001-52. ICS: C02F001-72. APPLICATION: RO 87-131339 Dec. 28, 1987. DOCUMENT TYPE: Patent CA Section: 60 (Waste Treatment and Disposal) Section cross-reference(s): 44, CA 119:55336

Alexoiu has reported that treatment of wastewater containing >10 g biodegradable organic substances/L includes (1) sedimentation for 40–140, (2) oxidation and chlorination for 120–160 min with 0.2–1.5 mol NaOCl/L and (3) 2-stage coagulation-flocculation with 50–500 mL Al sulfate/L followed by decantation. The treatment saves electrical energy and treatment agents. Typically, the treatment decreases the BOD5 value of the wastewater from 5000 to 60 mg/L.

Treatment of Kraft Bleaching Effluents by Lignin-degrading Fungi

I. Decolorization of Kraft Bleaching Effluents by the Lignin-Degrading Fungus IZU-154

Lee, Seon Ho; Kondo, Ryuichiro; Sakai, Kokki; Nishida, Tomoaki; Takahara, Yoshimasa (Fac. Agric., Kyushu Univ., Fukuoka 812, Japan). Mokuzai Gakkaishi, 39(4), 470–8 (English) 1993. CODEN: MKZGA7. ISSN: 0021-4795. DOCUMENT TYPE: Journal CA Section: 43 (Cellulose, Lignin, Paper, and Other Wood Products) Section cross-reference(s): 60, CA 119:273687

Three white-rot fungi (IZU-154, *Phanerochaete chrysosporium* Burds and *Coriolus versicoloy* (L. ex Fr.) Quel.) were tested by Lee et al for their abilities to decolorize kraft bleaching effluents from the 1st alk. extn. stage. The fungus IZU-154 exhibited the effective decolorization of not only hardwood but also softwood kraft pulp bleaching effluent. For the softwood bleach plant effluent containing 10,000 color units (CU), treatment with IZU-154 in the presence of a small amt. of glucose (0.5%) resulted in 78% and 89% reduction of the color after one- and two-day incubation, respectively. On the other hand, when the effluent was treated under the same conditions, only 32% and 36% of the decolorization with *C. versicolor* and 49% and 72% of the decolorization with *P. chrysosporium* were observed within one- and two-day incubations, respectively. In comparison with 53% and 78% of color reductions achieved by IZU-154 with the softwood bleach plant effluent including glucose, addition of glucono-d-lactone to the effluent showed remarkable decolorizations of 83% and 94% within 12- and 24-h incubations respectively. Furthermore, the color of the effluent was effectively removed by the addition of acetic acid as an additive. Therefore, a greater color reduction by IZU-154 can be expected for a possible biotechnological application.

Biological Decolorization of Paper Mill Wastewater

Nghiem, Nhuan P. (Nalco Chemical Co., USA). U.S. U.S. Pat. No. 5,407,577 A Apr. 18, 1995 10 pp. (United States of America). CODEN: USXXAM. CLASS: ICM: C02F003-34. NCL: 210606000. APPLICATION: U.S. Ser. No. 93-80933 Jun. 22, 1993. DOCUMENT TYPE: Patent CA Section: 60 (Waste Treatment and Disposal) Section cross-reference(s): 43, CA 123:92323

Nghiem, has investigated a process for removing color from a pulp and paper wastewater includes treating the wastewater with an enzyme, which is capable of oxidizing at least a portion of the color forming components of the wastewater, followed by treatment with a tannin-degrading microorganism capable of degrading at least a portion of the oxidized color-forming components.

Molecular Adsorption on Porous Styrene-Divinylbenzene Copolymers

II Froelich, Peter; Schwachula, Gerhard; Sarodnik, Eberhard (Sekt. Chem., Martin-Luther-Univ., Halle, Fed. Rep. Ger.). Plaste Kautsch., 27(10), 557–9 (German) 1980. CODEN: PLKAAM. ISSN: 0048-4350. DOCUMENT TYPE: Journal CA Section: 36 (Plastics Manufacture and Processing) Section cross-reference(s): 66, CA 94:31432

Froelich et al have observed that the sorption-desorption properties of humic acids, colored substances in molasses, and the antibiotic Turimycin [39405-35-1] on anion exchangers and porous divinylbenzene-styrene copolymer [9003-70-7] (or terpolymers with acrylic compounds) indicate that polymeric adsorbents can be used to advantage in removing organophilic substances from polar solvents.

Wastewater Treatment

Sakurai, Shigeru (Taisei Road Construction Co., Ltd., Japan). Jpn. Kokai Tokkyo Koho JP 54051250 Apr. 21, 1979 Showa, 3 pp. (Japanese). (Japan). CODEN: JKXXAF. CLASS: IC: C02C005-12; C02C005-04. APPLICATION: JP 77-117659 Sep. 30, 1977. DOCUMENT TYPE: Patent CA Section: 60 (Sewage and Wastes) Section cross-reference(s): 44, CA 91:78574

Sakurai et al have described a following method, $H_2O_2$ is added to wastewater, then the pH is adjusted to 4, and the wastewater is electrolyzed with an Fe anode to oxidize soluble pollutants. The insoluble pollutants are flocculated by adjusting the pH to 6.0–8.5. Thus, molasses manufactured wastewater containing 125 ppm COD was mixed with 0.5 mL 35% $H_2O_2$ solution/L, then the pH was adjusted to 2.9, and the wastewater was electrolyzed 20 min at 4.5–6.8 V with aeration. The treated wastewater was treated with NaOH to pH 8, then with polymer coagulant. The treated wastewater contained 8.0 ppm COD.

Purification of Molasses

Kaga, Toshio; Hiramoto, Toshitaka; Hamanaka, Kenji; Sato, Matsukichi; Tokida, Yoshiyasu (Mitsui Sugar Co., Ltd.; Japan Organo Co., Ltd., Japan). Japan. Kokai JP 52108035 Sep. 10, 1977 Showa, 7 pp. (Japanese). (Japan). CODEN: JKXXAF. CLASS: IC: C13J001-08. APPLICATION: JP 76-22259 Mar. 3, 1976. DOCUMENT TYPE: Patent CA Section: 44 (Industrial Carbohydrates), CA 88:75566

Kaga et al have used granular active carbon to decolorize brown liquors and molasses and regenerated by baking. Thus, a brown liquor of Brix 62-3, pH 8.1–8.3, and Stammer color 5.2–5.4 was passed through a regenerated active carbon column at 75–8° and solids-carbon ratio 100 with 64% decolorization, and molasses having Brix 34–6, pH 5.8, and Stammer color 70 was passed through the same column at 72–3° and solids-carbon ratio 3 with 82% decolorization. The active carbon was regenerated by heating at 800–50° in steam for 15 min.

Apparatus for Decolorizing Molasses

Chida, Takayuki; Tsuboi, Hidefumi (Hitachi Chemical Co., Ltd., Japan). Japan. Kokai JP 52090639 Jul. 30, 1977 Showa, 3 pp. (Japanese). (Japan). CODEN: JKXXAF. CLASS: IC: C13F003-00. APPLICATION: JP 76-6846 Jan. 23, 1976. DOCUMENT TYPE: Patent CA Section: 44 (Industrial Carbohydrates), CA 88:24490

Chida et al has shown that molasses was decolorized with active carbon in an adsorption tower containing plate electrodes impressed with D.C. voltage. The pigments were dielectric polarized by the electrodes and adsorbed by active carbon. Thus, molasses was decolorized 98% in an adsortion tower containing granular active carbon and vertical carbon electrodes at 10-cm intervals at 0.1 A/dm$^2$ and 8 V with retention time 3 h.

Removal of Coloring Substances from Molasses Solutions

Shvets, V. N.; Knogotkova, E. I.; Pavlyuchenko, L. N. (Kiev. Tekhnol. Inst. Pishchevoi Prom., Kiev, USSR). Izv. Vyssh. Uchebn. Zaved., Pishch. Tekhnol., (4), 31–5 (Russian) 1977. CODEN: IVUPA8. DOCUMENT TYPE: Journal CA Section: 44 (Industrial Carbohydrates), CA 88:8827

Shvets, et al have studied the filtration of molasses diluted to ~35% with water through a column filled with AV-16 GS [12626-33-4] anion exchanger in the chloride form removed >50% of the colored substances and organic impurities. The effectiveness of the removal of these substances decreased in the order invert sugar>melanoidins>caramels. The decrease of the molasses concentration improved its decolorization by the exchanger. Colored substances in molasses could be coagulated by d.c. and removed by filtration, but the procedure was effective only below 5% molasses concentration Colored substances in molasses were not absorbed by Soviet AGS-4 activated carbon.

Separation of Organic Acids from Kraft Black Liquors Using Membranes

Bowe, John (United States Dept. of Agriculture, USA). U.S. pat. appl. U.S. Ser. No. 725720 A0 Dec. 20, 1985, 19 pp. Avail. NTIS Order No. PAT-APPL-6-725720. (English). (United States of America). CODEN: XAXXAV. APPLICATION: U.S. Ser. No. 85-725720 Apr. 22, 1985. DOCUMENT TYPE: Patent CA Section: 43 (Cellulose, Lignin, Paper, and Other Wood Products), CA 104:151147

A method was described by Bowe to recover low mol. wt. aliphatic organic acids from kraft black liquor by ultracentrifugation (UC) of liquor followed by electrodialysis (E) of UC permeate, treating deionate from E with acid to precipitate lignin and electrolytic $H_2O$-splitting of resulting solution.

Research on the Decolorization of Melanoidin by Microorganisms

Part III. Detection of Lactic Acid and Amino Acids from Melanoidin Decolorized by Enzymes of Coriolus versicolor Ps4a Ohmomo, Sadahiro; Aoshima, Ikuko; Tozawa, Yukiko; Ueda, Kiyomoto (Inst. Appl. Biochem., Univ. Tsukuba, Sakura 305, Japan). Agric. Biol. Chem., 49(9), 2767-8 (English) 1985. CODEN: ABCHA6. ISSN: 0002-1369. DOCUMENT TYPE: Journal CA Section: 10 (Microbial Biochemistry), CA 103:175323

Ohmomo, et al have studied decolorization of melanoidin, a dark brown pigment in molasses wastewater, by enzymes from C. versicolor which produced lactic acid and various amino acids, such as, glycine, valine, glutamate, leucine, serine, etc. The amt. of lactic acid was equiv. to 10.5% of the C in melanoidin, whereas the amounts of amino acids were equiv. to 4–6% of the N in melanoidin. Treatment of molasses wastewater with the decolorizing enzymes reduced the color d. and at the same time, some useful organic acids were produced.

Kraft Overload Recovery

Beaupre, Marc F.; Cambron, Emile A.; Cambron, Emily T. (Can.). U.S. Pat. No. 4,470,876 A Sep. 11, 1984, 5 pp. (English). (United States of America). CODEN: USXXAM. CLASS: IC: D21C011-12. NCL: 162016000. APPLICATION: U.S. Ser. No. 82-400960 Jul. 22, 1982. DOCUMENT TYPE: Patent CA Section: 43 (Cellulose, Lignin, Paper, and Other Wood Products), CA 101:194014

Beaupre, has described a process, in which a portion of black liquor (BL) is concentrated to at least 40%, cooled to 5–50° C., acidified with $H_2SO_4$ containing $Na_2SO_4$, from $ClO_2$ preparation, to pH 4.5, heated to ~60° C. to separate lignin [9005-53-2], neutralized with NaOH, treated with the 1st portion of BL and burned in furnace to recover inorganic, was described for augmenting the recovery capacity of kraft system.

Recovery of Inorganic Compounds from Kraft Pulping Black Liquors (Domtar, Inc., Can.). Jpn. Kokai Tokkyo Koho JP 58036292 A2 Mar. 3, 1983 Showa, 5 pp. (Japanese). (Japan). CODEN: JKXXAF. CLASS: IC: D21C011-04. APPLICATION: JP 82-128830 Jul. 23, 1982. PRIORITY: CA 81-382387 Jul. 23, 1981. DOCUMENT TYPE: Patent CA Section: 43 (Cellulose, Lignin, Paper, and Other Wood Products), CA 99:89814

Na compounds from kraft pulping black liquors are recovered by first acidifying the cooled liquor with acids containing $H_2SO_4$ to pH <4.5 to coagulate lignin, heating the liquor at ~60° C., filtering the liquor, and finally cooling the filtrate to form crystallized $Na_2SO_4$ for recycling. Thus, kraft pulping black liquor (solids ~50%) was cooled to ~40° C., acidified with $H_2SO_4$ to pH ~3.5, heated at ~60° C., filtered, and cooled to ~0° C. to give recyclable $Na_2SO_4$.

Recovery of Solids from Black Liquors

Caperos Sierra, Alberto (Instituto Nacional de Investigaciones Agrarias, Spain). Span. ES 2006964 A6 May 16, 1989, 4 pp. (Spain) CODEN: SPXXAD. CLASS: ICM: D21C009-00. ICS: D21C011-00. APPLICATION: ES 88-1697 May 27, 1988. DOCUMENT TYPE: Patent CA Section: 43 (Cellulose, Lignin, Paper, and Other Wood Products) Section cross-reference(s): 60, CA 114:26042

Caperos et al has studied that solids in black liquors are recovered as precipitates by mixing 1 part black liquor with 0.1–1.0 part reactive precipitating agents and separating the precipitate. Thus, 1000 cm3 black liquor of E. globulus was mixed with 1000 cm$^3$ saturated solution of $CaCl_2$ in EtOH to form precipitate, which was separated with a centrifuge and washed with a 1:1 EtOH-water mixture to give precipitate 134, organic components 105, lignin 53, and pentosans 8 g, with 85% yield.

Research on the Decolorization of Melanoidin by Microorganisms

Part X. Continuous Decolorization of Molasses Waste Water Using Immobilized *Lactobacillus hilgardii* Cells Ohmomo, Sadahiro; Yoshikawa, Hiroshi; Nozaki, Kazuhiko; Nakajima, Tomoyoshi; Daengsubha, Wiwut; Nakamura, Isei (Inst. Appl. Biochem., Univ. Tsukuba, Tsukuba 305, Japan). Agric. Biol. Chem., 52(10), 2437-41 (English) 1988. CODEN: ABCHA6. ISSN: 0002-1369. DOCUMENT TYPE: Journal CA Section: 60 (Waste Treatment and Disposal) Section cross-reference(s): 16, CA 109:236219

The continuous decolorization of molasses wastewater (MWW) by immobilized cells of *Lactobacillus hilgardii* W—NS was studied by Ohmomo et al. The immobilized cells showed the maximal decolorization efficiency in the presence of 1% glucose with a medium pH of 5.0 at 45° C. On successive decolorization of MWW with recycling of the immobilized cells, >90% of the maximal decolorization yield was maintained for 1 mo when 0.05% peptone was added to MWW. In contrast, on continuous decolorization in a column type reactor, a sufficient decolorization yield could not be maintained, the decolorization yield dropped to half the maximal level during operation for 5 days.

Removal of Lignin from Alkaline Waste Pulping Liquors

Ishikawa, Hisao; Koide, Kazuo (Oji Paper Co., Ltd., Japan). Jpn. Kokai Tokkyo Koho JP 62090389 A2 Apr. 24, 1987 Showa, 7 pp. (Japan) CODEN: JKXXAF. CLASS: ICM: D21C011-04. ICS: C02-F001-44. APPLICATION. JP 85-226870 Oct. 14, 1985. DOCUMENT TYPE: Patent CA Section: 43 (Cellulose, Lignin, Paper, and Other Wood Products), CA 107:79808

Ishikawa & Koide, have reported the removal of colloidizing the soluble lignin, followed by ultrafiltration. Thus, beech chips were cooked at effective alkali 14%, sulfidity 25%, liquor ratio 4, and 165° C. The resulting black liquor was filtered, adjusted pH to 11, 10, and 9 with CO2, and ultrafiltered to give delignification 89%, 94%, and 97%, respectively.

Radiation Degradation of Molasses Pigments the Fading Color and Product

Sawai, Teruko; Sekiguchi, Masayuki; Tanabe, Hiroko; Sawai, Takeshi (Tokyo Metrop. Isot. Res. Cent., Setagaya 158, Japan). Tokyo-toritsu Aisotopu Sogo Kenkyusho Kenkyu Hokoku, 10, 1–9 (Japanese) 1993. CODEN: TASHEK. ISSN: 0289-6893. DOCUMENT TYPE: Journal CA Section: 60 (Waste Treatment and Disposal), CA 121:16954

Decolorization of wastewater treatment plant effluent containing molasses pigment by gamma irradiation was studied by Sawai et al. The COD decreased and the dark brown color of the effluent faded away with increasing radiation dosage. The high mol. wt. components of molasses pigment were degraded to lower mol. wt. substances and were decomposed finally to carbon dioxide. Organic acids, such as formic, acetic, oxalic, citric, and succinic acid were formed as intermediates. The radiation treatment was enhanced by the addition of $H_2O_2$.

Treatment of Black Pulping Liquor by Coacervation and Precipitation

Zhang, Muen (Peop. Rep. China). Faming Zhuanli Shenqing Gongkai Shuomingshu CN 1057079 A Dec. 18, 1991, 5 pp. (People's Republic of China). CODEN: CNXXEV. CLASS: ICM: D21C011-04. APPLICATION: CN 90-104181 Jun. 5, 1990. DOCUMENT TYPE: Patent CA Section: 43 (Cellulose, Lignin, Paper, and Other Wood Products) Section cross-reference(s): 60, CA 117:173646

Black pulping liquor is treated by adding solid CaCl2 or aq. solution containing $CaCl_2$ (2–5 g/100 mL) to black pulping liquor, coagulating, and precipitating to remove lignin and recover dild. NaOH solution which was reported by Zhang. Thus, 17.5 g lignin and 6 g/L NaOH aq. solution were recovered by adding 3 g $CaCl_2$ in 100 ml sulfate black liquor (from preparation of pine pulp), precipitating, and filtration.

Decolorization and Polysaccharide Production From Molasses Waste Water by Fungus D-1

Thananonniwat, Direk; Jatikavanich, Suchada; Sihanonth, Prakitsin (Fac. Sci., Chulalongkorn Univ., Bangkok 10330, Thailand). Microb. Util. Renewable Resour., Volume Date 1990, 7, 457–64 (English) 1991. CODEN: MURRE6. DOCUMENT TYPE: Journal CA Section: 60 (Waste Treatment and Disposal) Section cross-reference(s): 10, 16, 44, CA 117:55118

Thananonniwat et al have screened of 380 fungal strains isolated from Thai soil, fungal strain D-1 to decolorize molasses wastewater and produce polysaccharides at the same time. Conditions such as environmental factors and medium compn that affects growth, decolorization efficiency, and polysaccharide production were studied. Molasses wastewater supplemented with 2.5% glucose and 0.1% yeast ext., with the initial pH adjusted to 5.0, agitated on rotary shaker at 200 rpm, and incubated at 30° C. gave the max. growth rate of ~0.6257 g dried mycellal wt. per 100 mL of medium, max. decolorization activity of ~97%, max. polysaccharide prodn. of ~0.355 g, and the max dried matter wt. per 100 mL of medium.

Treatment of Molasses Wastewater by Ozonization and Biological Treatment

Ichikawa, Hiroyasu; Taira, Naohide; Wada, Shinji; Tatsumi, Kenji (Hydrospheric Environmental Protection Department, National Institute Resources and Environment, Tsukuba 305, Japan). Mizu Kankyo Gakkaishi, 19(12), 1004–1008 (Japanese) 1996 Nippon Mizu Kankyo Gakkai CODEN: MKGAEY. ISSN: 0916-8958. DOCUMENT TYPE: Journal CA Section: 60 (Waste Treatment and Disposal) Section cross-reference(s): 16, CA 126:135031

A sol. of molasses wastewater, pretreated by activated sludge, was ozonated and then completely decolorized by ozone by Ichikawa et al. Total organic C (TOC) could be reduced only to ~50% during a period of 60 min ozonization. The ozonated solution, after being mixed with activated sludge culture, was incubated for 10 days at 25° C., and biodegradability was then assessed by dissolved organic C (DOC) reduction. DOC of the nonozonated solution could hardly be reduced even after 10 days incubation, indicating biodegradability. For the ozonated solution of pretreated molasses wastewater, a DOC removal of >70% was achieved and DOC in the solution was <10 mg/L. Ozonization greatly improved the biodegradability of refractory organic compounds. A solution of molasses wastewater was ozonated directly. Ozone decolorized ~90% of the molasses wastewater but TOC was reduced only to ~8%. Biodegradability of ozonated molasses wastewater was improved.

In the hitherto known processes main drawbacks are use of acidic media, which involves corrosion problems, filtration problems due to colloidal particles and incomplete removal of organic as well as inorganic matter in the effluent water and color due to organics mainly lignin and mellanoidins.

In hitherto known processes attempts have been made to treat spent wash and black liquor separately.

OBJECTS OF THE INVENTION

The main object of the present invention is to provide a process for the treatment of an effluent comprising a mixture of spent wash from distillery and black liquor from pulp and paper industry.

Another object of the invention is to provide a process for reducing COD, BOD, TDS and color of the effluent water from the spent wash, black liquor and wash water from distilleries and pulp and paper mills.

Still another object of the invention is to provide an eco friendly process.

SUMMARY OF THE INVENTION

To meet the above objects, the present invention provides a process for removal of COD, BOD TDS and color simultaneously at ambient temperature from a mixture of spent wash from distillery and black liquor from pulp and paper industry, thus saving energy cost, the operation does not involve any use of mineral acid thus, avoiding corrosion problems. The novelty of the process lies in the use of flocculating agent, comprising a mixture of salt of Group three and transition metal, mixture of natural earth's along with an oxide of alkaline earth metal followed by the use of combination of ion exchange resins.

There is a continued interest on development of new improved process for removal of color, lignin, TDS, COD, BOD & other organic and inorganic matter produced during the alcohol fermentation and alkali digestion of pulp. It is a well-known fact that lignin and color in such types of effluents are not easily biodegradable and hence, has disposal problems in the natural environment.

DETAILED DESCRIPTION OF THE INVENTION

Accordingly, the present invention provides a process for treating an effluent comprising a mixture of spent wash and black liquor, which comprises mixing a effluent with flocculating agent for a period of 1–60 minutes at ambient temperature, allowing the effluent to settle for a period of 5–240 minutes, separating the supernatant, contacting the supernatant with a mixture of ion exchange resin for a period of 5–30 minutes, allowing it to settle and separate the supernatant to obtain the treated effluent. Indion 840 is strong acid macroporous cation exchange resin having styrene matrix with sulphite as functional group and Indion −930 A is a strong base macroporous Type I anion exchange resin having polyacrylic links with quaternary ammonium functional groups. The adsorption on these resins is reversible and the resins are resistant to organic fouling. In one of the embodiment the present invention involves treatment of three mixtures of spent wash, black liquor and wash water from paper mill, where the ratio of these mixture of spent wash:black liquor:wash water ranges between 50–200:200–400:150–300.

In another embodiment of the invention, the effluent water is selected from spent wash, black liquor, wash water or mixtures thereof.

In still another embodiment of the invention, the present invention involves treatment of three mixtures of spent wash, black liquor and wash water from paper mill, where the ratio of these mixture of spent wash:black liquor:wash water ranges between 50–200:200–400:150–300.

In yet another embodiment, the flocculating agent used is a mixture of three components.

In yet another embodiment, the first component of the flocculating agent used is selected from sulfate, chloride, nitrate of Group III elements and transition metals.

In yet another embodiment, the first component is preferably a mixture of aluminum and iron metal sulfates.

In yet another embodiment, the second component of the flocculating agent used is a metal oxide selected from alkali or alkaline earth metals.

In yet another embodiment, the second oxide component used is selected from a group consisting of Sodium, Potassium, Magnesium and Calcium.

In yet another embodiment, the second oxide component used is preferably Calcium oxide.

In yet another embodiment, the third component of the flocculating agent used is a mixture of natural earth's selected from a group comprising of fullers earth, bentonite, dolomite, sand, and garden soil.

In yet another embodiment, the third component used is a mixture of natural earth's selected preferably from dolomite and bentonite.

In yet another embodiment, the components of the flocculating agent comprises aluminum sulfate, ferrous sulfate, dolomite, bentonite and calcium oxide and are in the ratio ranging from 40 to 80, 25 to 50, 5 to 10, 5 to 10 and 1000 to 5000.

In yet another embodiment, the components of the flocculating agent used comprises aluminum sulfate:ferrous sulfate:dolomite:bentonite:calcium oxide in the ratio of 60:30:5:5:5000.

In yet another embodiment, the amount of flocculating agent used is ranging from 10.1 gms to 40.4 gms.

In yet another embodiment, the ratio of flocculating agent to the effluent used is 10.1–40.4 gm:400–600 ml In yet another embodiment, the ion-exchange resin used in step two is a mixture of commercially available ion-exchange resins, selected from strong acid macroporous cation exchange resin having styrene matrix and strong based macroporous Type I anion exchange resin having polyacrylic links in the ratio 1:1 (v/v).

In yet another embodiment, the ratio of flocculating agent to ion-exchange resins used is ranging between 10.01 to 40.4 gm:20 to 30 ml.

In yet another embodiment, the contact time of resin mixture with the supernatant obtained from the first step is ranging from 1–60 minutes, preferably in the range of 5–30 minutes.

The present invention involves treatment of three mixtures of spent wash, black liquor and wash water generated from paper mill as follows: Sample-1 wherein spent wash, black liquor and wash water are in the ratio of 200:400:250. In Sample-2 the ratio is 200:200:250 and in Sample-3 the ratio is 50:400:250.

The flocculating agent is selected from mixture of sulfate, chloride, nitrate of Group III elements and transition metals preferably a mixture of sulfate of aluminum and iron and an oxide of alkali or alkaline earth metals from Group I or II selected from a group comprising Sodium, Potassium, Magnesium and Calcium, preferably an oxide of Calcium along with natural earth's selected from fullers earth, bentonite, dolomite, sand, garden soil, preferably dolomite and bentonite. The components of the flocculating agent comprising of aluminum sulfate:ferrous sulfate:dolomite:bentonite are in the ratio of. 60:30:5:5.

In one of the features of the present invention, the mixture of resins is a mixture of commercially available resins selected from the group comprising IR-120, IR-400, MB-106, Gel-A 23, ADS-600, Indion-840 and Indion-930 A, preferably a mixture of Indion 840 and Indion 930 A. in 1:1 proportion (v/v).

In one more feature, the contact time of resin mixture with the supernatant obtained from the first step ranges from 1–60 minutes, preferably in the range of 5–30 minutes.

In one of the features of the present invention all the operations of the process were carried out at ambient temperature without any use of mineral acid.

In the feature of the present invention, after the first step of the mixture of effluent treatment, significant reduction of COD, BOD and color was observed for all the mixtures of effluents tested.

In yet another feature of the present invention after the second step of the effluent treatment using ion exchange resin, the dark color of the mixture of the effluent sample changed to almost colorless or straw color within 30 minutes. It was also observed that COD and TDS values were reduced to a great extent.

In another feature of the present invention the resin mixture used in the process could be regenerated with known methods and reused.

The process of the present invention is described herein bellow with reference to the examples which are illustrative only and should not be construed to the limit of scope of the present invention in any manner.

EXAMPLE—1

In the first step of the treatment a mixture of effluent containing 200 ml spent wash (COD—15888 ppm and TDS—20350), 400 ml black liquor (COD—18497 ppm and TDS—17870 ppm) and 250 ml wash water (COD—1027 ppm and TDS—1650 ppm) from paper mill was prepared and was diluted to 1800 ml with tap water (COD—5375, BOD—758, TDS—6870 ppm, pH—8.89) in a 2 lit beaker, to which a flocculent comprising a mixture of metal salts, aluminum and ferrous sulfate, dolomite and bentonite (200 mg) in 40:50:5:5 proportion and calcium oxide 20 g was added and poured in a 2 lit measuring cylinder for 30 minutes at ambient temperature. The supernatant thus obtained was analyzed for its COD, BOD, TDS and color reduction using spectrophotometer at 480 nm after adjusting the pH of the sample to ~8. The treated sample of the mixture showed COD—3517, BOD—540, TDS—6640 pH—12 and color reduction was found to be 74%.

In the second step of the treatment 50 ml of the supernatant thus obtained from the first treatment was taken separately in 100 ml conical flask to which a mixture of ion exchange resins (Indion-840 and Indion 930 A 2.5% each v/v) was added and stirred on magnetic stirrer at ambient temperature for 30 minutes. The filtered solution was analyzed for COD, TDS and color reduction. The treated sample showed COD—1280 ppm, TDS—690 ppm and color reduction was 94%.

EXAMPLE—2

In the first step of the treatment a mixture of effluent containing 200 ml spent wash (COD—15888 ppm and TDS—20350), 200 ml black liquor (COD—18497 ppm and TDS—17870 ppm) and 250 ml wash water (COD—1027 ppm and TDS—1650 ppm) from paper mill was prepared and was diluted to 1800 ml with tap water (COD—3320, BOD—684, TDS—4510 ppm, pH—8.71) in a 2 lit beaker, to which a flocculent comprising a mixture of metal salts, aluminum and ferrous sulfate, dolomite and bentonite (200 mg) in 40:50:5:5 proportion and calcium oxide 20 g was added and poured in a 2 lit measuring cylinder for 30 minutes at ambient temperature. The supernatant thus obtained was analyzed for its COD, BOD, TDS and color reduction using spectrophotometer at 480 nm after adjusting the pH of the sample to ~8. The treated sample of the mixture showed COD—2252 ppm, BOD—420, TDS—4660 ppm, pH—12 and color reduction was found to be 78%.

In the second step of the treatment 50 ml of the supernatant thus obtained from the first treatment was taken separately in 100 ml conical flask to which a mixture of ion exchange resins (Indion-840 and Indion 930 A 2.5% each v/v) was added and stirred on magnetic stirrer at ambient temperature for 30 minutes. The filtered solution was analyzed for COD, TDS and color reduction. The treated sample showed COD—996 ppm, TDS—420 ppm and color reduction was 94%.

EXAMPLE—3

In the first step of the treatment a mixture of effluent containing 200 ml spent wash (COD—15888 ppm and TDS—20350), 200 ml black liquor (COD—18497 ppm and TDS—17870 ppm) and 250 ml wash water (COD—1027 ppm and TDS—1650 ppm) from paper mill was prepared and was diluted to 1800 ml with tap water (COD—3320, BOD—684, TDS—4510 ppm, pH—8.71) in a 2 lit beaker, to which a flocculent comprising a mixture of metal salts, aluminum and ferrous sulfate, dolomite and bentonite (400 mg) in 40:50:5:5 proportion and calcium oxide 40 g was added and poured in a 2 lit measuring cylinder for 30 minutes at ambient temperature. The supernatant thus obtained was analyzed for its COD, BOD, TDS and color reduction using spectrophotometer at 480 nm after adjusting the pH of the sample to ~8. The treated sample of the mixture showed COD—2134 ppm, BOD—520, TDS—4870 ppm, pH—12 and color reduction was found to be 80%.

In the second step of the treatment 50 ml of the supernatant thus obtained from the first treatment was taken separately in 100 ml conical flask to which a mixture of ion exchange resins (Indion-840 and Indion 930 A 2.5% each v/v) was added and stirred on magnetic stirrer at ambient temperature for 30 minutes. The filtered solution was analyzed for COD, TDS and color reduction. The treated sample showed COD—916 ppm, TDS—440 ppm and color reduction was 94%.

EXAMPLE—4

In the first step of the treatment a mixture of effluent containing 50 ml spent wash (COD—15888 ppm and TDS—20350), 400 ml black liquor (COD—18497 ppm and TDS—17870 ppm) and 250 ml wash water (COD—1027 ppm and TDS—1650 ppm) from paper mill was prepared and was diluted to 1150 ml with tap water (COD—7114 ppm, BOD—1080, TDS—8090 ppm, pH—8.89) in a 2 lit beaker, to which a flocculent comprising a mixture of metal salts, aluminum and ferrous sulfate, dolomite and bentonite (100 mg) in 40:50:5:5 proportion and calcium oxide 25 g was added and poured in a 2 lit measuring cylinder for 30 minutes at ambient temperature. The supernatant thus obtained was analyzed for its COD, BOD, TDS and color reduction using spectrophotometer at 480 nm after adjusting the pH of the sample to ~8. The treated sample of the mixture showed COD—4308 ppm, BOD—600, TDS—8270 ppm, pH—12 and color reduction was found to be 80%.

In the second step of the treatment 50 ml of the supernatant thus obtained from the first treatment was taken separately in 100 ml conical flask to which a mixture of ion exchange resins (Indion-840 and Indion 930 A 2.5% each v/v) was added and stirred on magnetic stirrer at ambient temperature for 30 minutes. The filtered solution was analyzed for COD, TDS and color reduction. The treated sample showed COD—1691 ppm, TDS—830 ppm and color reduction was 94%.

EXAMPLE—5

In the first step of the treatment a mixture of effluent containing 200 ml spent wash (COD —15888 ppm and TDS—20350) was diluted with tap water to 450 ml in a 2 lit beaker, to which a flocculent comprising a mixture of metal salts, aluminum and ferrous sulfate, dolomite and bentonite (100 mg) in 40:50:5:5 proportion and calcium oxide 25 g was added and poured in a 2 lit measuring cylinder. To this, a mixture of black liquor (400 ml) of COD—18497 ppm and TDS—17870 ppm and wash water (250 ml) of COD—1027 ppm and TDS—1650 ppm from paper mill was slowly added and allowed to settle for 2 hours. The supernatant thus obtained was analyzed for its COD, BOD, TDS and color reduction using spectrophotometer at 480 nm after adjusting the pH of the sample to ~8. The treated sample of the mixture showed COD—4545 ppm, BOD—900, TDS—7640 ppm, pH—12 and color reduction was found to be 78%.

In the second step of the treatment 50 ml of the supernatant thus obtained from the first treatment was taken separately in 100 ml conical flask to which a mixture of ion exchange resins (Indion-840 and Indion 930 A 2.5% each v/v) was added and stirred on magnetic stirrer at ambient temperature for 30 minutes. The filtered solution was analyzed for COD, TDS and color reduction. The treated sample showed COD—1818 ppm, TDS—790 ppm and color reduction was 94%.

EXAMPLE—6

In the first step of the treatment a mixture of effluent containing 200 ml spent wash (COD—15888 ppm and TDS—20350), 400 ml black liquor (COD—18497 ppm and TDS—17870 ppm) and 250 ml wash water (COD—1027 ppm and TDS—1650 ppm) from paper mill was prepared and was diluted to 1800 ml with tap water (COD—5375, BOD—758, TDS—6870 ppm, pH—8.89) in a 2 lit beaker, to which a flocculent comprising a mixture of metal salts, aluminum and ferrous sulfate, dolomite and bentonite (100 mg) in 40:50:5:5 proportion and calcium oxide 10 g was added and poured in a 2 lit measuring cylinder for 30 minutes at ambient temperature. The supernatant thus obtained was analyzed for its COD, BOD, TDS and color reduction using spectrophotometer at 480 nm after adjusting the pH of the sample to ~8. The treated sample of the mixture showed COD—4742 ppm, BOD—640, TDS—5680 ppm pH—12 and color reduction was found to be 35%.

In the second step of the treatment 50 ml of the supernatant thus obtained from the first treatment was taken separately in 100 ml conical flask to which a mixture of ion exchange resins (Indion-840 and Indion 930 A 2.5% each v/v) was added and stirred on magnetic stirrer at ambient temperature for 30 minutes. The filtered solution was analyzed for COD, TDS and color reduction. The treated sample showed COD—1628 ppm, TDS—800 ppm and color reduction was 85%.

ADVANTAGES OF THE INVENTION

The present invention involves the treatment of spent wash from distillery and black liquor and wash water of pulp & paper mill simultaneously.

The present invention involves removal of COD, BOD, TDS and color simultaneously at ambient temperature thus saving energy cost.

The process does not involve any use of mineral acid, thus avoiding corrosion problems.

The process does not involve use of any expensive chemicals or enzymes, thus it is cost effective.

The process does not involve use of any special equipment, thus it is easy to handle.

The process end products are not hazardous in nature, thus it is an eco-friendly process.

What is claimed is:

1. A process for obtaining water with reduced BOD, COD and color by treating an effluent containing a mixture of spent wash, black liquor and wash water, the said process comprising mixing the effluent with a flocculating agent consisting of a mixture of aluminum sulfate, ferrous sulfate, dolomite, bentonite and calcium oxide, obtaining a clear supernatant, followed by treating the clear supernatant with a mixture of a macroporous cation exchange resin and a macroporous Type I anion exchange resin, to reduce said BOD, COD and color.

2. A process as claimed in claim 1 wherein, the spent wash used is obtained from distilleries.

3. A process as claimed in claim 1 wherein, the w/w ratio of spent wash:black liquor:wash water is in the range of 50 to 200:200 to 400:150 to 300.

4. A process as claimed in claim 3 wherein, the w/w ratio of aluminum sulfate:ferrous sulfate:dolomite:bentonite:calcium oxide used is 60:30:5:5:5000.

5. A process as claimed in claim 1 wherein, the w/w ratio of aluminum sulfate:ferrous sulfate:dolomite:bentonite:calcium oxide is in the range of from 40 to 80:25 to 5.0:5 to 10:5 to 10:5000 to 40000.

6. A process as claimed in claim 1 wherein, the w/v ratio of flocculating agent to the effluent is in the range of 10.1–40.4 gm:400–600 ml.

7. A process as claimed in claim 1 wherein, the w/v ratio of flocculating agent to ion-exchange resins used is in the range of 10.1 to 40.4 gm:20 to 30 ml.

8. A process as claimed in claim 1 wherein, the contact time of resin mixture with the clear supernatant obtained ranges from 1 to 60 minutes.

9. A process as claimed in claim 8, wherein the contact time of resin mixture with the clear supernatant ranges from 5 to 30 minutes.

10. A process as claimed in claim 1, wherein the black liquor and wash water used is obtained from pulp and paper industry.

11. A process as claimed in claim 1, wherein the v/v ratio of the macroporous cation exchange resin and macroporous Type I anion exchange resin is 1:1.

12. A process as claimed in claim 1, wherein the flocculating agent is contacted with the effluent mixture for a time period of 1 to 60 minutes.

13. A process as claimed in claim 1, wherein the flocculating agent is contacted with the effluent mixture at a temperature ranging between 20 to 40° C.

14. A process as claimed in claim 1, wherein the clear supernatant is obtained by settling the mixture.

15. A process a claimed in claim 1, wherein the time period for settling ranges from 5 to 240 minutes.

* * * * *